3,814,602

PROCESS FOR PRODUCING A PHOTOLITHOGRAPHIC PRINTING PLATE

Fumiaki Shinozaki, Tomoaki Ikeda, Yoshito Mukaida, and Masayoshi Tsuboi, Asaka, Japan, assignors to Fuji Photo Film Co., Ltd., Minami Ashigara-shi, Kanagawa, Japan Filed July 17, 1972, Ser. No. 272,510
Claims priority, application Japan, July 15, 1971, 46/52,579
Int. Cl. G03c 5/54
U.S. Cl. 96—29 L 20 Claims

ABSTRACT OF THE DISCLOSURE

In a process for producing a photolithographic printing plate which comprises forming by the diffusion transfer process a reversal silver image of an original image on a hydrophilic surface portion of a cellulose organic acid ester sheet having a hydrophilic surface portion containing a silver halide developing nucleus substance used in the diffusion transfer process and removing the hydrophilic surface portion having said silver image to expose an oleophilic surface of said cellulose organic acid ester sheet, the improvement which comprises removing said hydrophilic surface portion having said silver image with an aqueous etching solution containing a peroxodisulfate is disclosed.

BACKGROUND OF THE INVENTION

(1) Field of the invention

Figure 1:
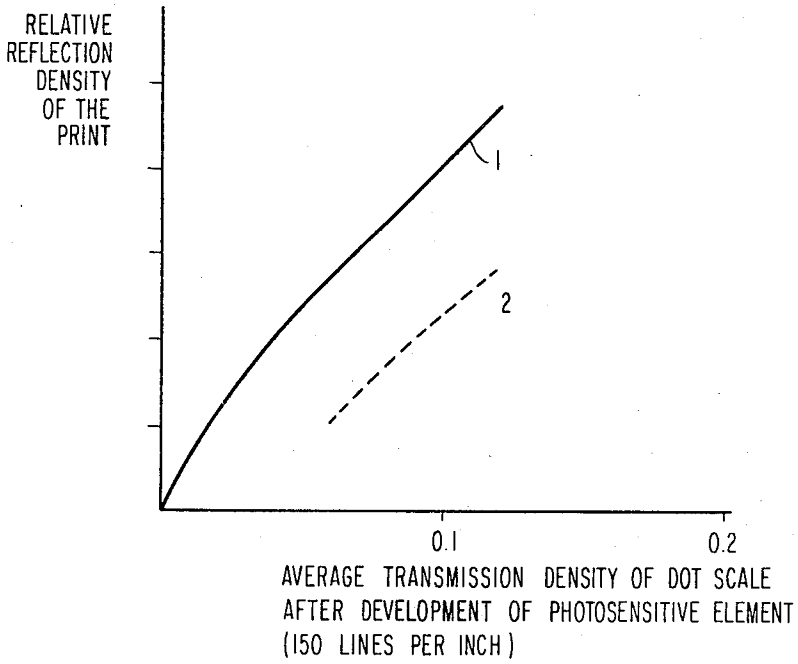

The present invention relates to a process for producing a photolithographic printing plate and, more particularly, to a process for producing a photolithographic printing plate which comprises forming silver images on an oleophilic support having a hydrophilic surface and removing the hydrophilic surface part corresponding to the silver images to expose the oleophilic support.

(2) Description of the prior art

In general, the lithographic printing plate comprises an oleophilic ink receiving area which forms an image part and a hydrophilic area which forms a non-image part. In producing such a printing plate, a method for changing the image part of the hydrophilic surface into a part having oleophilic properties and a method which comprises providing a hydrophilic layer on a surface of an oleophilic material and exposing the oleophilic part by removing the hydrophilic layer at only the image part are known.

For example, British Patent Specification No. 1,129,366 describes a process for producing a printing plate which comprises using a sheet element having a hydrophilic layer containing a nucleus substance used for a diffusion transfer process on a support having an oleophilic surface, forming a silver image on the hydrophilic layer, and removing the corresponding hydrophilic layer utilizing the silver image to expose the oleophilic support. Further, U.S. Pat. No. 3,385,701 describes a process for producing a printing plate which comprises carrying out diffusion transfer development by contacting an exposed negative element with a sheet element having a hydrophilic layer containing a nucleus substance used for the diffusion transfer process on a support having an oleophilic surface to form a silver image, and removing the corresponding hydrophilic layer utilizing the silver image to expose the oleophilic support.

However, according to the processes described in British Patent Specification No. 1,129,366 and U.S. Pat. No. 3,385,701, close adherence of the surface of the support and the hydrophilic layer is not sufficient, because the hydrophilic layer is applied to an oleophilic surface of the support of the printing plate. Consequently, these processes have the disadvantages that the hydrophilic layer of the non-image part peels off on printing and staining is caused by adhesion of oily inks. Further, the hydrophilic layer used in these processes, which is composed of gelatin and colloidal silica does not always have sufficient hydrophilic properties, and consequently it is not possible to obtain many printed sheets having good quality, because the oily ink adheres generally to the non-image part to cause staining as the number of printing sheets increases.

In German Patent Publication (OLS) No. 2,048,594, a process for producing a photolithographic printing plate by which these disadvantages are improved is described.

Namely, the photolithographic printing plate is produced by a method comprising exposing to an image of an original a photosensitive sheet which is prepared by applying a photosensitive silver halide photographic emulsion to a hydrophilic surface of a cellulose organic acid ester sheet having a hydrophilic surface portion containing a nucleus substance used for the diffusion transfer process, forming a reversal silver image of the original on the hydrophilic surface portion by the diffusion transfer process, and removing the hydrophilic surface portion having the silver image by treating the hydrophilic surface portion with an aqueous solution containing hydrogen peroxide to expose an oleophilic surface of the cellulose organic acid ester sheet.

In this process, however, strong rubbing of the hydrophilic surface at etching so as to expose the oleophilic surface is necessary and it is difficult to expose the oleophilic surface completely, because the hydrophilic portion sometimes remains or is injured by the rubbing. Furthermore, if the hydrophilic surface part is thinned previously so as to be capable of exposing the oleophilic surface by rubbing softly, staining is caused easily at printing and particularly fine lines are easily crushed.

An object of the present invention is to improve the defects of the prior processes and to provide a process for producing a photolithographic printing plate by etching the silver image formed by the diffusion transfer process.

SUMMARY OF THE INVENTION

As the result of much research on etching solutions for removing the hydrophilic surface portion corresponding to the silver image on a cellulose organic acid ester sheet so as to expose the oleophilic part of the cellulose organic acid ester sheet, the present inventors have found that the above-described object can be attained by treating the sheet with an aqueous solution of peroxodisulfate.

BRIEF DESCRIPTION OF THE ACCOMPANYING DRAWING

The figure shows the relationship between the relative reflection density of a print and the silver content of the printing plates after development, in which the plates are produced using a halftone wedge and exposing to light a sheet prepared in accordance with a process of the present invention (Curve 1) and a plate prepared in accordance with a prior art process (Curve 2).

DETAILED DESCRIPTION OF THE INVENTION

An embodiment of the present invention is explained in the following. A nucleus substance used for the silver halide diffusion transfer process is incorporated in a hydrophilic surface portion of a cellulose organic acid ester sheet which is prepared by hydrolyzing a surface portion using alkalis or acids. To this hydrophilic surface part, a photosensitive silver halide emulsion is applied. As the photosensitive silver halide emulsion, those, such as silver chloride, silver bromide, silver bromochloride, silver chloroiodide, silver bromoiodide, silver chlorobromoiodide emulsions and those described in U.S. Pat. Nos. 3,120,795, 3,385,701 and 3,020,155 and British Pat. No. 1,129,366, being used in the photographic field generally are used preferably. Color sensitivity of the emulsions is usually orthochromatic, but regular emulsions can be used if desired. In producing color prints from color originals, panchromatically sensitized emulsions are used. Suitable orthochromatically and panchromatically sensitized emulsions with dyes as described in U.S. Pat. Nos. 2,526,632 and 2,503,776 can be used. The emulsions can be subjected to metal sensitization, for example, as described in U.S. Pat. Nos. 2,448,060, 2,399,083 and 2,597,915 etc., sulfur sensitization, for example, as described in U.S. Pat. Nos. 1,574,994, 2,410,689, etc. or reduction sensitization, for example, as described in U.S. Pat. No. 2,487,850 etc., or can contain an antifogging agent and a surface active agent. When the photosensitive sheet element is exposed through an original or using a camera, a positive print is obtained if the original is positive. The original may have line drawings or half-tone gradations. Further, it is possible to expose directly to an original having half-tone gradation using a screen. Exposure can be carried out either by close contact or using enlargement. The exposed sheet element is treated with a diffusion transfer developer such as is described in U.S. Pat. No. 3,120,795, U.S. Pat. No. 3,385,701, and British Pat. No. 930,572. The developed sheet element is treated with a hot water to remove the emulsion layer. Although this step is not always necessary, it is possible to include this step in order to prevent any undesirable etching on the hydrophilic surface portion from the silver image of the exposed portion on the emulsion layer. In another process as described in U.S. Pat. No. 3,385,701 for forming a positive silver image on a hydrophilic surface portion of a cellulose organic acid ester sheet, the hydrophilic surface part is brought into contact with a sheet having a photosensitive silver halide emulsion layer which has been exposed to light in the presence of a diffusion transfer developer to form a silver image on the hydrophilic surface portion.

The silver image obtained in such manner is treated with an etching solution containing a peroxosulfate or a peroxodisulfate. The ammonium, sodium, potassium, lithium, barium and strontium salts of peroxodisulfate are preferred.

By this treatment, the hydrophilic surface part having the silver image can be removed easily.

Although both of the above-described sulfates exhibit the same effect, peroxodisulfate is preferable from the standpoint of stability in solution. These can be used alone or as combinations thereof in an amount of from 0.375% by weight to 30% by weight based on the weight of the treating solution.

In order to accelerate the etching function, at least one of a cupric salt, an acid or a substance which forms a complex having a low solubility by reacting with the silver is added to the etching solution, i.e., a substance whose silver salt has a low solubility. As the cupric salt, water soluble cupric salts such as cupric chloride, cupric bromide, cupric nitrate, cupric sulfate and cupric citrate are suitable, with the cupric halides being particularly preferred. Suitable acids which can be used are organic acids such as acetic acid, citric acid, tartaric acid, fumaric acid, maleic acid and benzene sulfonic acid etc. and inorganic acids such as hydrochloric acid, nitric acid, sulfuric acid and phosphoric acid.

As the substance which forms a complex having low solubility by reacting with silver, for example, a solubility product less than $2\times10^{-7}$, the water soluble halides (chlorides, bromides, iodides) tartarates, carbonates, chromates, oxalates, thiocyanates, sulfides, and formates, can be used. The ammonium, sodium, potassium, lithium, barium and strontium salts of these materials are preferred. The halides are also preferred.

These accelerating agents can be used alone or as mixtures thereof in an amount of from 0.05 to 50% by weight based on the weight of the treating solution (although some compounds have a solubility less than 50% by weight, they can be used if the solubility is at least 0.05% by weight).

Where the peroxodisulfate is used together with at least one of a cupric salt, an acid or a substance which forms a complex having low solubility by reacting with silver, the amount of the peroxodisulfate can range from 0.0125% to 30% by weight based on the weight of the treating solution calculated as ammonium peroxodisulfate.

A preferred amount of the peroxodisulfate is from 0.1 to 20% by weight calculated as ammonium peroxodisulfate based on considerations of the stability of the etching solution with the lapse of time and the stability to the photosensitive material to be treated. Under such conditions, the areas adjacent the silver image are etched within 30 seconds at 5° C. to 40° C. and the cellulose and the derivatives thereof are deteriorated.

When the surface of the sheet element subjected to the etching treatment is rubbed softly, the hydrophilic surface portion is removed easily in comparison with that treated with hydrogen peroxide, by which the oleophilic surface of the cellulose sheet appears, while the remaining hydrophilic surface portion remains as it is. The printing plate produced by such manner can be used directly or as an offset printing plate in conventionally known methods. From the printing plate of the present invention, more than 20,000 sheets of stable prints having good quality can be produced using commercially available printing inks and a wetting solution. In treating with an aqueous solution containing peroxodisulfate, the following advantages in comparison with the case of treating with hydrogen peroxide are obtained. When the sheet is exposed properly using the same continuous gradation wedge, inks adhere well on the hydrophilic surface portion in comparison with the case of treating with hydrogen peroxide, even though the quantity of silver is very small. Accordingly, it is possible to decrease the quantity of silver halide in the negative emulsion layer which is an important factor of the cost in the preparation of the photosensitive sheet, and consequently a lowering of the cost of the preparation of the photosensitive sheet can be expected. Moreover, when the sheet is exposed properly using the same half-tone gradation wedge, printing of the highlights parts can be carried out correctly, and consequently small dots can be printed clearly in comparison with the case of treating with hydrogen peroxide, since the difference between the hydrophilic surface and the oleophilic surface is distinct. This is a particularly important aspect in the printing of a half-tone original, by which more preferable prints can be produced in comparison with the case of treating with hydrogen peroxide.

Suitable cellulose organic acid esters which can be used as the sheet material in the present invention include cellulose acetate, cellulose diacetate, cellulose triacetate, cellulose propionate, cellulose butyrate, cellulose acetate propionate and cellulose acetate butyrate, etc. These cellulose ester sheets are treated to provide a hydrophilic property to their surface by hydrolyzing the surface part of the sheet with an aqueous solution of a caustic alkali such as sodium hydroxide or potassium hydroxide, an aqueous solution of an acid such as acetic acid or a treating solution prepared by adding a polar organic solvent such as methanol and ethanol to the above-described aqueous solutions. A nucleus substance used for the diffusion transfer process as disclosed in U.S. Pat. Nos. 2,774,667, 2,698,445, 2,698,237, 2,823,122, 2,698,238, etc. is incorporated into this hydrophilic surface portion. As the nucleus substance those used commonly in the diffusion transfer process, for example, colloidal heavy metals such as colloidal silver and sulfur compounds of heavy metals such as silver sulfide and nickel sulfide can be and are preferably used. The nucleus substance can be incorporated in the hydrophilic surface portion of the cellulose ester sheet after surface hydrolysis or simultaneously with surface hydrolysis. Alternatively the nucleus substance can be added previously in the preparation of the sheet, which is then treated so as to have a surface hydrophilic properly.

When dimensional stability or mechanical strength is required in the sheet element comprising the cellulose organic acid ester used in the present invention, the sheet element can be backed with a polyethylene terephthalate film or a metal plate such as aluminum plate as a support. For example, a sheet element which is prepared by applying a subbing layer and a layer of a cellulose organic acid ester on the subbing layer can be used.

Further, in order to form a silver image portion the hydrophilic surface part, a process comprising putting on diffusion transfer paper may be used.

The present invention is explained in greater detail by the following examples.

EXAMPLE 1

A triacetyl cellulose film having a thickness of 135$\mu$ was dipped in the following treating solution at 35° C. for 50 seconds to form a hydrophilic surface thereon by hydrolyzing the surface thereof and simultaneously to incorporate a nucleus substance used for the diffusion transfer process. The film was washed with water and dried. The above used treating solution was prepared by reacting 0.034 g. of nickel nitrate with 5.27 g. of ammonium polysulfide in 53.3 g. of glycerol to produce a nickel sulfide colloidal solution and diluting this colloidal solution with a solution having the following composition.

| | |
|---|---|
| Water ------ml-- | 950 |
| Sodium hydroxide ------g-- | 200 |
| Methanol ------ml-- | 1000 |

To this sheet element a silver bromochloride emulsion (70 molar percent: silver chloride) containing 1 mol/kg. of silver was applied to obtain a thickness of 3$\mu$. The sheet element was exposed to light through a continuous gradation positive scale and developed at 25° C. for 30 seconds using the following developer.

Composition of the developer:

| | |
|---|---|
| Water ------ml-- | 750 |
| p-Methylaminophenol sulfate ------g-- | 5 |
| Anhydrous sodium sulfite ------g-- | 65 |
| Hydroquinone ------g-- | 15 |
| Anhydrous sodium thiosulfate ------g-- | 15 |
| Sodium hydroxide ------g-- | 20 |
| Water to make 1000 ml. | |

The sheet element was dipped in warm water at 40° C. to remove the emulsion layer and dipped then for 30 seconds in an etching solution propared by mixing equivalent amounts of Solution Ia and Solution IIa having the following compositions at 25° C.

| Solution Ia: | G. |
|---|---|
| Cupric chloride (dihydrate) ------ | 10 |
| Citric acid ------ | 10 |
| Water to make 1000 ml. | |

| Solution IIa: | G. |
|---|---|
| Ammonium peroxodisulfate ------ | 120 |
| Water to make 1000 ml. | |

By this treatment, the positive silver image of the original formed on the hydrophilic surface portion of the cellulose sheet was bleached and the image portion was etched. Then the sheet element was rubber softly using a cotton swab or a sponge, by which the hydrophilic portion of the silver image was removed and the oleophilic surface of the triacetyl cellulose was exposed. The resulting printing plate was placed on a conventional offset printing machine. When printing was carried out using a commerciallly available printing ink and a wetting solution, more than 20,000 sheets of prints having good quality were produced.

On the other hand, for the purposes of comparison, the same treatment was carried out with using the same sheet element, the same developer and the same treating solution, but equimolar amounts of hydrogen peroxide instead of ammonium peroxodisulfate in the above-described treating solution were used.

Where the ink density (minimum density) of the print obtained using the printing plate prepared by the present invention was equal to that obtained by the comparison method, the transmission density just after development of the photosensitive sheet was 0.25 for the sheet element of the present invention and 0.75 for the comparison sheet element. It can be seen from this result that faithful printing can be carried out using a lesser amount of silver halide according to the process of the present invention.

When the same procedure was repeated using a halftone scale, the results shown in the figure were obtained. Namely, the figure, in which 1 represents the process of the present invention and 2 represents the case of the process using hydrogen peroxide shows that 1 always gives a high reflection density (of the print) in comparison with 2 and reproduces faithfully even though at less than a transmission density of 0.06 (high-light portions), but 2 cannot express the highlight part.

EXAMPLE 2

A photosensitive sheet produced using the same conditions as described in Example 1 was treated in the same manner as described in Example 1. However, a solution prepared by mixing equivalent amounts of Solution Ib and Solution IIb having the following compositions was used as the etching solution.

| Solution Ib: | G. |
|---|---|
| Cupric chloride (dihydrate) ------ | 10 |
| Tartaric acid ------ | 10 |
| Water to make 1 liter. | |
| Solution IIb: | |
| Potassium peroxodisulfate ------ | 120 |
| Water to make 1 liter. | |

By carrying out the same procedure as in Example 1, prints having good quality were obtained.

EXAMPLE 3

A photosensitive sheet produced using the same conditions as described in Example 1 was treated in the same manner as described in Example 1. However, a solution prepared by mixing equivalent amounts of Solution Ic and Solution IIc having the following compositions was used as the etching solution.

| Solution Ic: | G. |
|---|---|
| Cupric sulfate (pentahydrate) ------ | 40 |
| Citric acid ------ | 170 |
| Potassium bromide ------ | 10 |
| Water to make 1 liter. | |
| Solution IIc: | |
| Ammonium peroxodisulfate ------ | 120 |
| Water to make 1 liter. | |

By carrying out the same procedure as described in Example 1, prints having good quality were obtained.

EXAMPLE 4

A silver halide photosensitive element exposed to light through a positive original was laid on a triacetyl cellulose sheet containing a nucleus substance for the diffusion transfer process which was incorporated into the hydrophilic surface portion using the same conditions as described in Example 1 at 25° C. for 30 seconds with the interposing therebetween of a developer having the same composition as described in Example 1. The negative element was washed with water and treated for 30 seconds with an etching solution prepared by mixing equivalent amounts of Solution Id and Solution IIc having the following compositions at 20° C.

| | |
|---|---|
| Solution Id: | G. |
| Cupric sulfate (pentahydrate) | 25.0 |
| Sodium potassium tartarate | 9.0 |
| Potassium bromide | 20.0 |
| Water to make 1 liter. | |
| Solution IIc: | |
| Ammonium peroxodisulfate | 50 |
| Water to make 1 liter. | |

By this etching treatment, the hydrophilic surface portions near the silver image formed on the hydrophilic surface portion of the triacetyl cellulose sheet were removed by etching to expose the oleophilic surface. Thus, an offset lithographic plate was obtained. This printing plate was placed on a conventional offset printing machine and printing was carried out with using a commercially available printing ink and a wetting solution, by which more than 8000 sheets of stable prints having good quality were obtained.

EXAMPLE 5

A triacetyl cellulose film having a thickness of 135$\mu$ was dipped for 15 minutes in a 1 N solution of sodium hydroxide at 50° C. and then in a 0.1 mol aqueous solution of sodium sulfide at 25° C. for a minute. After removing the solution on the surface by squeezing, the film was dipped for 3 minutes in a 0.1 molar aqueous solution of silver nitrate at 25° C. The film was washed with water and dried. By carrying out the same procedure as described in Example 1, prints having good quality were obtained.

EXAMPLE 6

A subbing layer was applied to a polyethylene terephthalate film having a thickness of 135$\mu$. To this layer, a triacetyl cellulose was applied so as to have a thickness of 10$\mu$. Using this sheet element, the same procedure as described in Example 1 was carried out, by which prints having good quality were obtained.

EXAMPLE 7

Prints having good quality were obtained using the same procedure as described in Example 3 but using a cellulose acetate butyrate film ("Type 161–40" produced by the Eastman Kodak Co.) instead of the triacetyl cellulose film.

EXAMPLE 8

A subbing layer was applied to a polyethylene terephthalate film having a thickness of 135$\mu$. To this film, triacetyl cellulose containing silver sulfide dispersed therein was applied so as to have a thickness of 8$\mu$. The sheet element was hydrolyzed at 40° C. for 60 seconds using a solution composed of 1000 ml. of water, 200 g. of sodium hydroxide and 1000 ml. of methanol. Using this sheet element, the same procedure as described in Example 1 was carried out, by which prints having good quality were obtained.

While the invention has been described in detail and in terms of specific embodiments thereof it will be apparent that various changes and modifications can be made therein without departing from the spirit and scope thereof.

What is claimed is:

1. In a process for producing a photolithographic printing plate which comprises forming by the diffusion transfer process a reversal silver image of an original image on a hydrophilic surface portion of a cellulose organic acid ester sheet having a hydrophilic surface portion containing a silver halide developing nucleus substance used in the diffusion transfer process and removing the hydrophilic surface portion having said silver image to expose an oleophilic surface of said cellulose organic acid ester sheet, the improvement which comprises removing said hydrophilic surface portion having said silver image with an aqueous etching solution containing a peroxodisulfate and an accelerator selected from the group consisting of a cupric salt, an acid or a silver-complex forming substance.

2. The process of claim 1, wherein said peroxodisulfate is selected from the group consisting of ammonium peroxodisulfate, potassium peroxodisulfate, sodium peroxodisulfate, lithium peroxodisulfate, barium peroxodisulfate and strontium peroxodisulfate.

3. The process of claim 1, wherein said cupric salt is cupric chloride, cupric bromide, cupric nitrate, cupric sulfate or cupric citrate.

4. The process of claim 1, wherein said acid is acetic acid, citric acid, tartaric acid, fumaric acid, maleic acid, benzene sulfonic acid, hydrochloric acid, nitric acid, sulfuric acid or phosphoric acid.

5. The process of claim 1, wherein said silver-complex forming substance is a water soluble salt selected from the group consisting of chloride, bromide, iodide, tartarate, carbonate, chromate, oxalate, thiocyanate, sulfide and formate.

6. The process of claim 1, wherein said cellulose organic acid ester sheet is cellulose acetate, cellulose diacetate, cellulose triacetate, cellulose propionate, cellulose butyrate, cellulose acetate propionate or cellulose acetate butyrate.

7. The process of claim 6, wherein said cellulose organic acid ester sheet is cellulose diacetate or cellulose triacetate.

8. The process of claim 1, wherein said peroxodisulfate is present in an amount of from 0.375% by weight to 30% by weight based on the weight of the etching solution.

9. The process of claim 1, wherein said cupric salt is a water soluble cupric salt.

10. The process of claim 1, wherein said cupric salt is a cupric halide.

11. The process of claim 1, wherein said silver-complex forming substance reacts with silver to form a product whose solubility is less than $2\times10^{-7}$.

12. The process of claim 1, wherein said accelerator is present in an amount of from 0.05 to 50% by weight based on the weight of the treating solution.

13. The process of claim 1, wherein said peroxodisulfate is present in an amount of from 0.0125 to 30% by weight based on the weight of the etching solution, calculated as ammonium peroxodisulfate.

14. The process of claim 13, wherein said peroxodisulfate is present in an amount of from 0.1 to 20% by weight based on the weight of the etching solution, calculated as ammonium peroxodisulfate.

15. The process of claim 1, wherein said removing of said hydrophilic surface portion is performed at 5° C. to 40° C. within 30 seconds.

16. The process of claim 1, wherein said accelerator is said cupric salt and said acid.

17. The process of claim 1, wherein said accelerator is said cupric salt.

18. The process of claim 1, wherein said accelerator is said acid.

19. The process of claim 1, wherein said accelerator is said silver-complex forming substance.

20. The process of claim 5, wherein said water soluble salt is a compound selected from the group consisting of ammonium, sodium, potassium, lithium, barium and strontium salts.

References Cited

UNITED STATES PATENTS

| | | | |
|---|---|---|---|
| 3,260,198 | 7/1966 | Wagemans | 96—29 L |
| 3,373,114 | 3/1968 | Grunwald | 252—100 |
| 3,634,262 | 1/1972 | Grunwald | 134—42 |
| 2,428,804 | 10/1947 | Drexel | 252—100 |

FOREIGN PATENTS

| | | |
|---|---|---|
| 1,186,745 | 1/1962 | Germany. |

RONALD H. SMITH, Primary Examiner

J. L. GOODROW, Assistant Examiner